United States Patent
Minehan et al.

(10) Patent No.: US 12,112,208 B1
(45) Date of Patent: Oct. 8, 2024

(54) SWITCHING OF WORKLOADS ACCORDING TO SWITCHOVER COST

(71) Applicant: Core Scientific, Inc., Bellevue, WA (US)

(72) Inventors: Kristy-Leigh A. Minehan, Kirkland, WA (US); Ganesh Balakrishnan, Sammamish, WA (US); Evan Adams, Seattle, WA (US); Carla Cortez, Los Angeles, CA (US); Ian Ferreira, Issaquah, WA (US)

(73) Assignee: Core Scientific, Inc., Austin, TX (US)

(*) Notice: Subject to any disclaimer, the term of this patent is extended or adjusted under 35 U.S.C. 154(b) by 491 days.

(21) Appl. No.: 17/383,004

(22) Filed: Jul. 22, 2021

Related U.S. Application Data

(60) Provisional application No. 63/054,987, filed on Jul. 22, 2020.

(51) Int. Cl.
| | |
|---|---|
| *G06F 9/50* | (2006.01) |
| *G06F 11/30* | (2006.01) |
| *G06N 20/00* | (2019.01) |
| *G06Q 20/06* | (2012.01) |
| *G06Q 20/38* | (2012.01) |

(52) U.S. Cl.
CPC ............ *G06F 9/505* (2013.01); *G06F 9/5077* (2013.01); *G06F 11/3006* (2013.01); *G06F 11/3062* (2013.01); *G06N 20/00* (2019.01); *G06Q 20/0655* (2013.01); *G06Q 20/381* (2013.01); *G06F 2209/5022* (2013.01); *G06F 2209/505* (2013.01); *G06F 2209/508* (2013.01); *G06Q 2220/00* (2013.01)

(58) Field of Classification Search
None
See application file for complete search history.

(56) References Cited

U.S. PATENT DOCUMENTS

2020/0364682 A1* 11/2020 Maloney ............... H04L 9/0643

OTHER PUBLICATIONS

Salimitari et al., "Profit Maximization for Bitcoin Pool Mining: A Prospect Theoretic Approach", 2017 IEEE 3rd International Conference on Collaboration and Internet Computing, pp. 267-274, Oct. 15-17, 2017 (Year: 2017).*

* cited by examiner

*Primary Examiner* — Eric C Wai
(74) *Attorney, Agent, or Firm* — Fishman Stewart PLLC

(57) ABSTRACT

A method for automated switching of workloads on computing devices to increase returns such as rewards or transaction fees in a cryptocurrency blockchain network is disclosed. A plurality of signals impacting the profitability of mining for a plurality of different cryptocurrencies and plurality of different mining pools are monitored. In response to the plurality of signals indicating a different cryptocurrency and mining pool combination is more profitable, the computing device workload is automatically switched. Switching cost may be calculated and used to prevent unprofitable switches. The signals may be used to train a machine learning model that may be used to predict future profitability for automatic switching.

20 Claims, 4 Drawing Sheets

SWITCHING OF WORKLOADS ACCORDING TO SWITCHOVER COST

CROSS-REFERENCE TO RELATED APPLICATIONS

This application claims the benefit of, and priority to, U.S. Provisional Patent Application Ser. No. 63/054,987, filed Jul. 22, 2020, the disclosure of which is hereby incorporated herein by reference in its entirety and for all purposes.

TECHNICAL FIELD

The present disclosure generally relates to the field of computing and, more particularly, to systems and methods for automated switching of workloads for computing devices.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many cryptocurrencies (e.g., Bitcoin, Litecoin) are based on a technology called blockchain, in which transactions are combined into blocks. These blocks are stored with previous blocks of earlier transactions into a ledger (the "blockchain") and rendered immutable (i.e., practically unmodifiable) by including a hash. The hash is a number that is calculated based on the blocks and that meets the blockchain's particular criteria. Once the block and hash are confirmed by the cryptocurrency network, they are added to the blockchain. The hashes can be used to verify whether any of the prior transactions or blocks on the blockchain have been changed or tampered with. This creates an immutable ledger of transactions and allows the cryptocurrency network to guard against someone trying to double spend a digital coin.

Many cryptocurrency networks consist of a large number of participants that repeatedly attempt to be the first to calculate a hash meeting the blockchain network's requirements. They receive a reward (e.g., a coin reward and or transaction fee reward) that motivates them to continue participating (mining).

Many blockchain networks require computationally difficult problems to be solved as part of the hash calculation. The difficult problem requires a solution that is a piece of data which is difficult (e.g., costly, time-consuming) to produce, but is easy for others to verify and which satisfies certain requirements. This is often called "proof of work". A proof of work (PoW) system (or protocol, or function) is a consensus mechanism. It deters denial of service attacks and other service abuses such as spam on a network by requiring some work from the service requester, usually meaning processing time by a computer.

Participants in the network operate computing devices such as PCs, servers, or specialized computing devices called mining rigs or miners. Because of the difficulty involved and the amount of computation required, the miners are typically configured with specialized components that improve the speed at which hashes or other calculations required for the blockchain network are performed. Examples of specialized components include application specific integrated circuits (ASICs), field programmable gate arrays (FPGAs), graphics processing units (GPUs) and accelerated processing unit (APUs).

Many participants in blockchain networks participate via computing pools (often called mining pools). One reason for this is that the probability of an individual computing device solving a particular computational problem first (required to the solve the block and win the reward) is small. By pooling resources and splitting any received rewards, computing pools allow blockchain network participants (e.g., miners) to participate and secure rewards even if they are unlikely to individually find the solution. This feature has made computing pools quite popular in recent years, with a significant percentage of many blockchain's computing or hash power coming from such pools.

The pools are typically operated on one or more servers with one or more network connections that are used to communicate with pool participants. The server divides and distributes the computation problem (e.g., finding a nonce that results in a hash below a target value) to the pool participants in a way that allows them to work on the problem in parallel without duplicating efforts. This can be done by assigning each pool participant a different set of nonces to check. Nonces are used in proof-of-work systems to vary the input to a cryptographic hash function so as to obtain a hash for a certain input that fulfills certain arbitrary conditions, such as being below a predetermined value in order to satisfy a target difficulty value for the blockchain network.

Participants in mining networks face operating costs such as computing device costs, electricity costs, hosting costs, and maintenance costs. These costs can significantly impact the profitability of mining, particularly when the fluctuating value of cryptocurrencies is low.

For at least these reasons, there is a desire for systems and methods that can increase the profitability and return on investment of computing devices used for mining. The foregoing discussion is intended only to illustrate examples of the present field and is not a disavowal of scope.

SUMMARY

The profitability of miners and return on investment may be improved by automatically switching workloads based on a number of data signals that are monitored (e.g., in real time or near real time) and used to calculate current profitability (or predict future profitability) of different workloads such as different cryptocurrencies or different combinations of mining pools and cryptocurrencies. Based on the monitored data signals, one or more computing devices can be instructed to switch workloads in order to improve profitability or maximize return on investment.

For example, and without limitation, in one embodiment the method may optimize returns generated by a computing device by instructing the computing device to work on a first workload (e.g., first cryptocurrency) and monitoring a plurality of signals impacting the profitability of mining for a plurality of different cryptocurrencies. In response to the plurality of signals indicating a second cryptocurrency is the most profitable, the computing device may be automatically switched to mine the second cryptocurrency. The plurality of signals may for example comprise one or more of the following: difficulties (e.g., current blockchain network difficulty), hashrates (e.g., current blockchain network hashrate, the computing device's hashrate, mining pool hashrate), pool reward formula, power costs (e.g., cost for electricity consumed by the computing device), switchover costs (e.g., predicted mining rewards that will be lost during the switching time that it takes the computing device to move from one workload to another such as switching mining pools or cryptocurrencies). The monitoring may be performed in real-time or near real-time using real-time data, near real-time data, historical data, or a combination thereof (e.g., by accessing online mining pool statistics, online blockchain network statistics, reading data from the mining pool the computing device is mining for).

A method for optimizing returns generated by one or more computing devices is also contemplated. In some embodiments, the method may comprise monitoring a plurality of signals impacting mining profitability for a plurality of combinations of different cryptocurrencies and different mining pools, calculating a most profitable cryptocurrency and mining pool combination from the plurality of combinations of different cryptocurrencies and different mining pools, and instructing the computing device to switch workloads to the most profitable cryptocurrency and mining pool combination. A difference in profitability may be calculated relative to a current workload being worked on by the computing device. A switchover cost representative of a time period during which no work is performed by the computing device when changing workloads may also be calculated. The computing device may be instructed to switch the cryptocurrency and pool combination used if the difference in profitability is greater than the switchover cost.

In some embodiments, the monitoring and the calculating may be performed on a management computer that communicates with the computing device via a network. In other embodiments, the monitoring and calculating may be performed on the computing device executing the workload (e.g., as an application or as firmware). The monitoring and the calculating may be performed in real time, near real time, or with delay timing (e.g., every 5 minutes or every hour).

In some embodiments, the plurality of signals may for example include, but not be limited to, one or more of the following: expected reward, current difficulty, current exchange rate relative to a fiat currency, the computing device's hash rate, the computing device's power consumption, the computing device's predicted failure rate, mining difficulty, exchange rates, and pool fees.

In some embodiments, a machine learning model may be trained using historical data of the signals to identify correlations between the plurality of signals and the profitability of each of the plurality of cryptocurrency and mining pool combinations. The trained machine learning model may be used to perform the calculations to identify the most profitable cryptocurrency and mining pool combinations at a particular point in time. The trained machine learning model may also be used to determine when to instruct the computing device to switch workloads and what power level setting at which to operate.

The method may be implemented as a non-transitory, computer-readable storage medium storing instructions executable by a processor of a computing device. When executed, the instructions may cause the computing device to monitor a plurality of signals impacting the profitability of mining for a plurality of different cryptocurrencies in a plurality of different mining pools, calculate a most profitable cryptocurrency and mining pool combination based on the plurality of signals, and switch workloads to the most profitable cryptocurrency and mining pool combination.

The instructions may be firmware or applications instructions and may be executable to optimize the total return on investment for the computing device based on signals such as network hash rate, the computing device's power consumption, the computing device's hash rate, the power cost for the computing device, the computing device's estimated lifespan, the computing device's estimated failure rate, and the computing device's estimated switchover cost.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
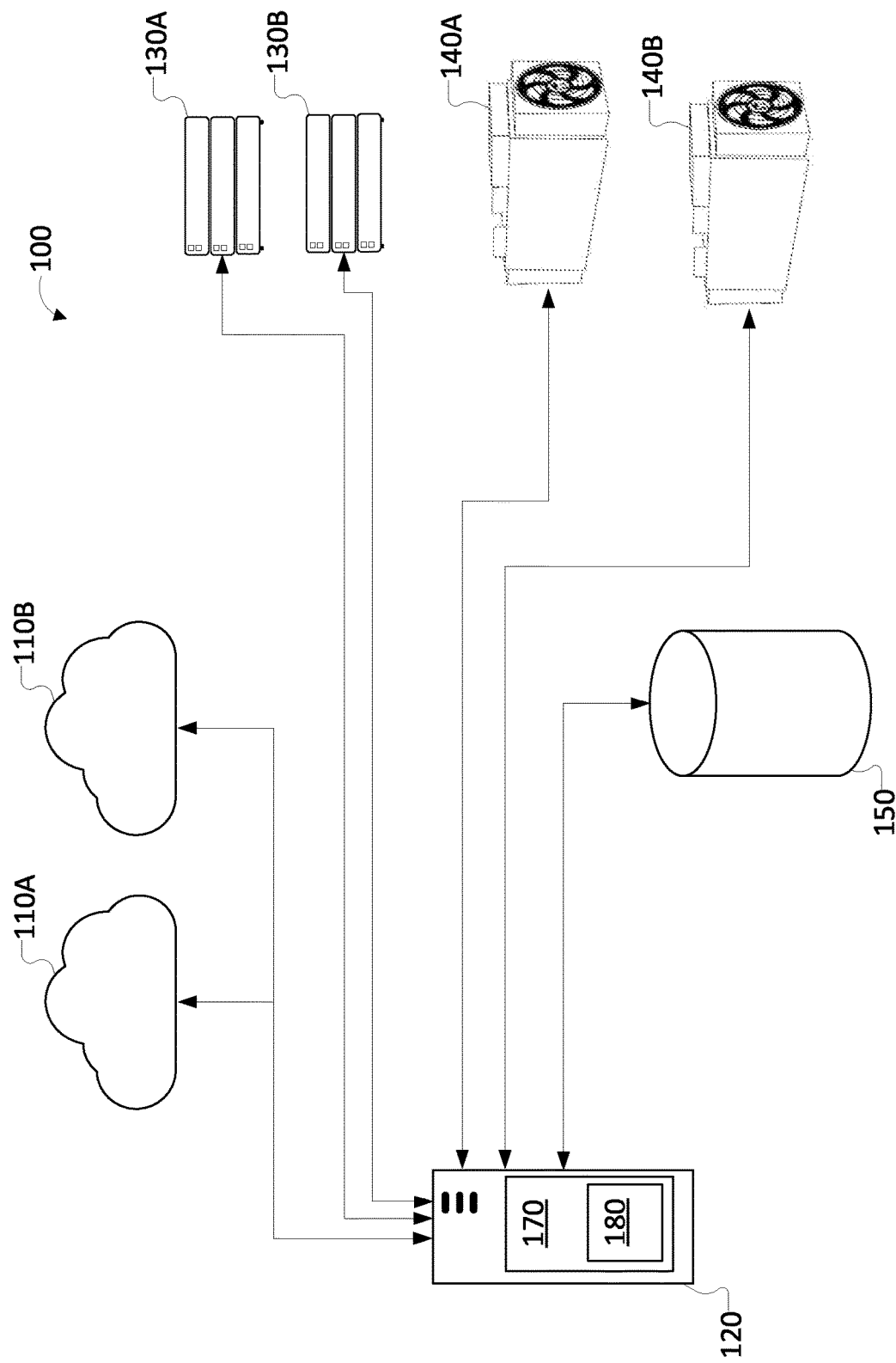
FIG. 1 is a schematic view generally illustrating an example of a system for automatically switching computing devices to improve profitability and return on investment according to teachings of the present disclosure.

Turning now to FIG. 1, a schematic view generally illustrating an example of a system for automatically switching computing devices to improve profitability and return on investment according to teachings of the present disclosure is shown. In this embodiment, system 100 comprises a management computer 120 that is connected via a network to a number of computing devices 130A-B and 140A-B. Computing devices 130A-B may for example be GPU or APU-based, and computing devices 140A-B may for example be ASIC-based. Management computer 120 may be a PC (e.g., physical or virtual), a server (e.g., physical or virtual), or an appliance. Management computer 120 may be configured to execute a management application 170 that monitors data signals from network data sources 110A-B (e.g., cloud or internet based data sources for information such as cryptocurrency exchange rates, blockchain network hashrates, blockchain network or mining pool difficulty, pool fees, pool status, pool account balance, etc.). These signals may for example be received in real time, near real time, or periodically (e.g., every 10 minutes or every hour). Management application 170 may also be configured to monitor data signals from other sources such as a local data storage 150 with information such as power costs, computing device power consumption, switching times or costs. Management application 170 may also be configured to monitor data signals from computing devices 130A-B and 140A-B (e.g., computing device hashrate, computing device temperature, computing device voltage level, computing device status).

In some embodiments, management application 170 may be configured to use some or all o of the data signals received to calculate a profitability for each of a number of different crypto currencies, mining pools, or cryptocurrency and mining pool combinations. For example, a first crypto currency may have a low difficulty and high value (exchange rate) relative to a fiat currency like the US dollar (USD), while a second cryptocurrency may have a high difficulty and low value relative to the USD, making the first cryptocurrency more profitable for a computing device to mine. Similarly, a first pool for the first cryptocurrency may presently have a higher pool fee or may be offline, whereas a second pool for the first cryptocurrency may have lower fees and have a good or online status. This would make the combination of the first cryptocurrency and the second mining pool the most profitable combination. As a result, the management application 170 may automatically instruct one or more of computing devices 130A-B and 140A-B to switch to mining the first cryptocurrency in the second mining pool. If computing devices 130A-B are GPU-based devices that are efficient at calculating EtHash calculations, and computing devices 140A-140B are ASIC-based devices optimized for SHA-256 hash calculations, management application 170 may take the computing device's device type into consideration and determine the most profitable cryptocurrency or cryptocurrency and mining pool combinations separately for each different computing device or different computing device type.

In some embodiments, management application 170 may have an artificial intelligence module 180 (e.g., a machine learning program, subroutine, library, or class) that is trained (e.g., reinforcement learning) on historical data (e.g., from network data sources 110A-B, computing devices 130A-B and 140A-B, and local data storage 150 (e.g., to detect correlations between the data signals and future cryptocurrency profitability or cryptocurrency/pool combination profitability).

In some embodiments, management application 170 or artificial intelligence module 180 may go beyond calculated or estimated profitability and optimize for lifetime return on investment (ROI) for computing devices 130A-B and 140A-B by gathering data signals including the estimated lifespan of each particular computing device.

Computing devices 130A-B and 140A-B may include one or more of a variety of configurations. For example and without limitation, a plurality of computing devices may be disposed in a common facility and/or may be configured for mining cryptocurrency. Computing devices may be configured to run various software. For example and without limitation, computing devices may be configured to run cryptocurrency mining software (e.g., cgminer) and/or software that may be configured to compute the SHA-256 algorithm. Some computing devices configured for cryptocurrency mining, such as GPUs (graphics processing units), ASICs (application specific integrated circuits), and/or FPGAs (field programmable gate arrays), may in some instances operate significantly differently than traditional CPUs (central processing units) that may be associated with traditional servers. For example, they may generate significantly more heat and may be controllable to change their operating frequencies, operating voltages, fan speeds, etc. to shift their power usage (and associated heat generation) up or down.

With examples, system 100 may include a first computing device, such as management server or management computer 120 or other control computing device, and may include and/or be connected to a plurality of second computing devices that may be disposed in a common facility. For example and without limitation, at least 100, at least 1,000, at least 10,000, and/or at least 50,000 computing devices may be disposed in a common facility. Management computer 120 may be configured to monitor and/or control, at least in part, operation of the plurality of second computing devices. A second computing device may, for example and without limitation, include a cryptocurrency mining computing device (a "miner") such as devices 130A-B and 140A-B and/or an artificial intelligence computing device.

In examples, a first computing device may be configured to optimize the current (time) output (e.g., return on investment or ROI) of second computing devices.

For example and without limitation, the first computing device may be configured to obtain information about one or more second computing devices. Such information may include, for example and without limitation, hash rate, power consumption, failure rate, and/or switchover cost that may be associated with switching the second computing device from mining a first cryptocurrency to mining a second cryptocurrency. The information may be obtained, at least in part, directly from the second computing devices in real-time or substantially real-time, such as opposed to aggregated historical data.

With examples, the first computing device may be configured to obtain information regarding a plurality of cryptocurrencies, such as mining difficulty, exchange rates, and/or pool fees.

In examples, the first computing device may be configured to apply artificial intelligence/machine learning to the second computing device information and/or the cryptocurrency information to determine what cryptocurrency should be mined to maximize return on investment, which may correspond to an expected award amount for mining activities less the costs (e.g., power consumption) associated with the mining activities. The first computing device may control the second computing devices and instruct them to switch to mining the most profitable cryptocurrency.

Figure 2:
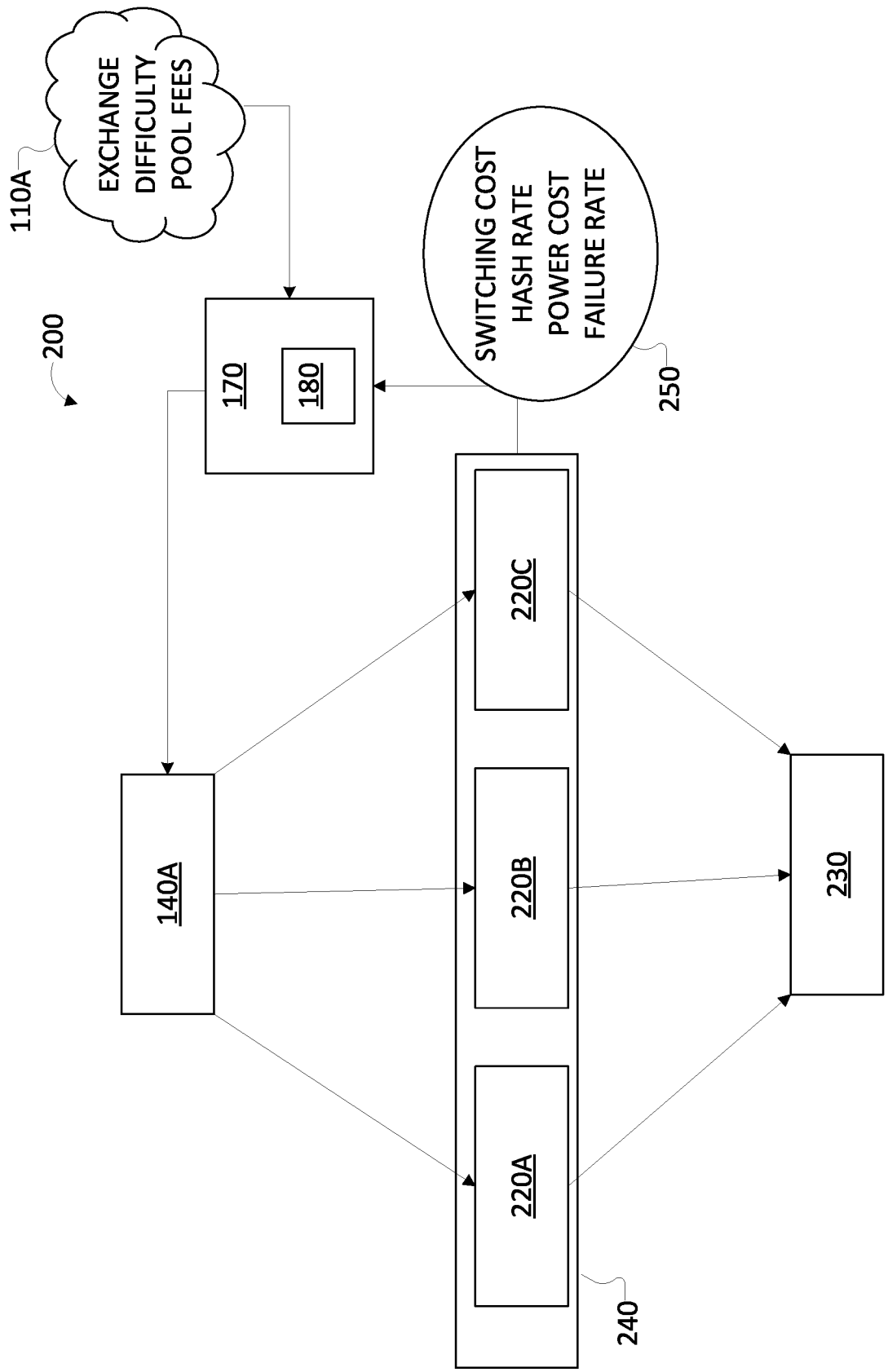
FIG. 2 is a data flow diagram generally illustrating another example of a system for automatically switching computing devices to maximize return on investment according to teachings of the present disclosure.

Turning now to FIG. 2, a data flow diagram generally illustrating another example of a system for automatically switching computing devices to maximize return on investment according to teachings of the present disclosure is shown. System 200 performs automatic switching of workloads (e.g., cryptocurrencies) to improve return on investment (ROI) for mining. In this example embodiment, management application 170 monitors data signals from network sources 110A such as cryptocurrency exchange rates, blockchain or pool difficulty, and pool fees. Local data signals 250 are also monitored such as switching costs, computing device hash rate, power cost, and computing device predicted or measured failure rate. These signals may be processed (e.g., a number of the most recent data signals may be averaged to smooth signals that have a high variability) and may be used by management application 170 (e.g., via artificial intelligence module 180 or via programmed logic) to calculate a current profitability (or a predicted future profitability) for different cryptocurrencies such as Bitcoin (BTC), Bitcoin Cash (BCH), and Bitcoin SV (BSV) and inform when to send automatic switching instructions to computing device 140A. Computing device 140A contributes work to pool 240 working on blocks 220A-C, and rewards (if any) from pool 240 for work on those blocks are received and deposited into a specified pool account or withdrawal wallet 230. Some pools only deposit rewards once a day, while others may deposit rewards more frequently.

Figure 3:
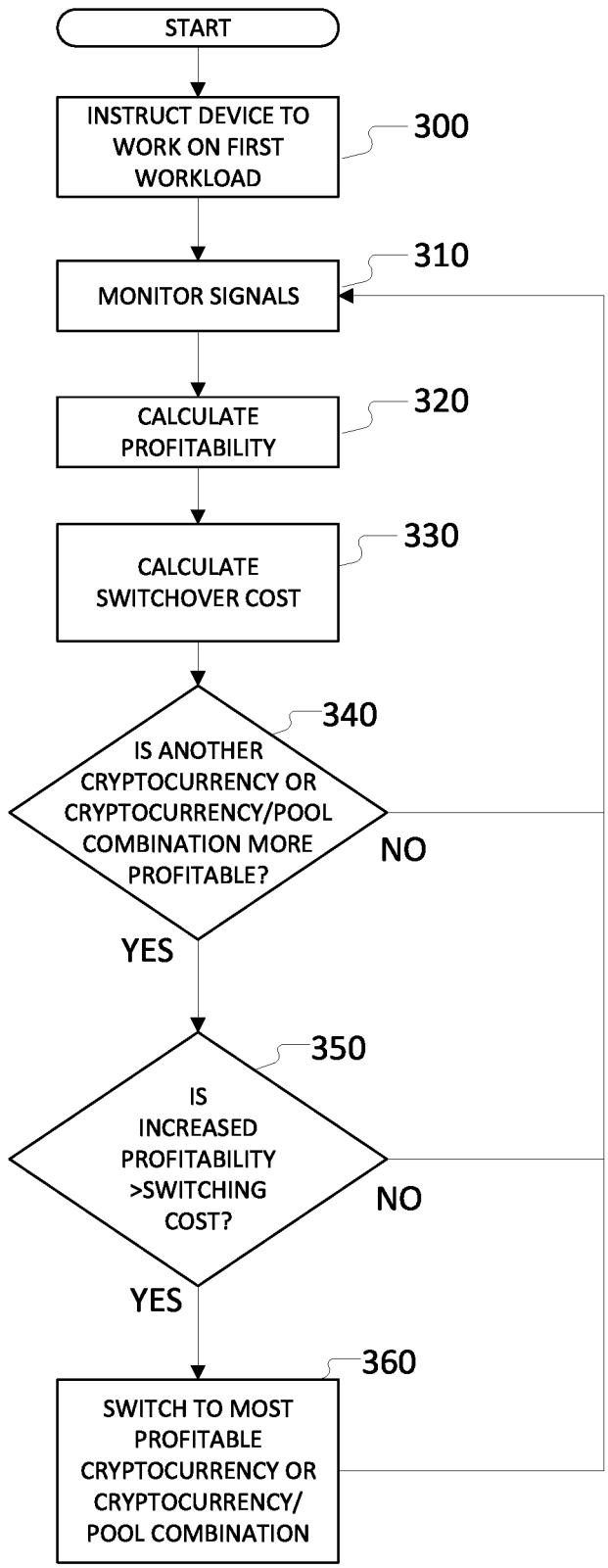
FIG. 3 is a flow chart generally illustrating an example of a method of automatically switching computing devices to improve profitability according to teachings of the present disclosure.

Turning now to FIG. 3, a flow chart generally illustrating an example of a method of automatically switching computing devices to improve profitability according to teachings of the present disclosure is shown. In this example embodiment (others are possible and contemplated), one or more computing devices (e.g., miners) are instructed to work on a first workload (step 300) such as hash calculations for a first mining pool for a first cryptocurrency blockchain. A set of data signals are monitored (step 310), and those signals are used to calculate a profitability (step 320) for each cryptocurrency or cryptocurrency/pool combination if multiple pools supporting the same cryptocurrency are used. A switchover cost may also be calculated (step 330). The switchover cost may be based on a measured or estimated switching time. In some embodiments, the switchover cost may be increased as the computing device ages to reflect the increased chance that a computing device may fail during a switch (particularly if the switch requires a reboot).

If another cryptocurrency or cryptocurrency/pool combination is determined to be more profitable (step 340), and the increase in profitability that would be earned by switching before the next predicted switch is greater than the revenue lost due to the switching time (step 350), the computing device or devices may be instructed to switch to the more profitable cryptocurrency or cryptocurrency/pool combination (step 360).

In some embodiments, if no more profitable cryptocurrency network or cryptocurrency/pool combination is identified (step 340), or if the increase in profitability that would be earned by switching before the next predicted switch is less than the revenue lost due to the switching time (step 350), no switching instruction is sent to the computing device. For example, some computing devices must be rebooted in order to change cryptocurrencies or mining pools. This can take a certain among of time during which no work for any pool is performed and no reward is earned.

Figure 4:
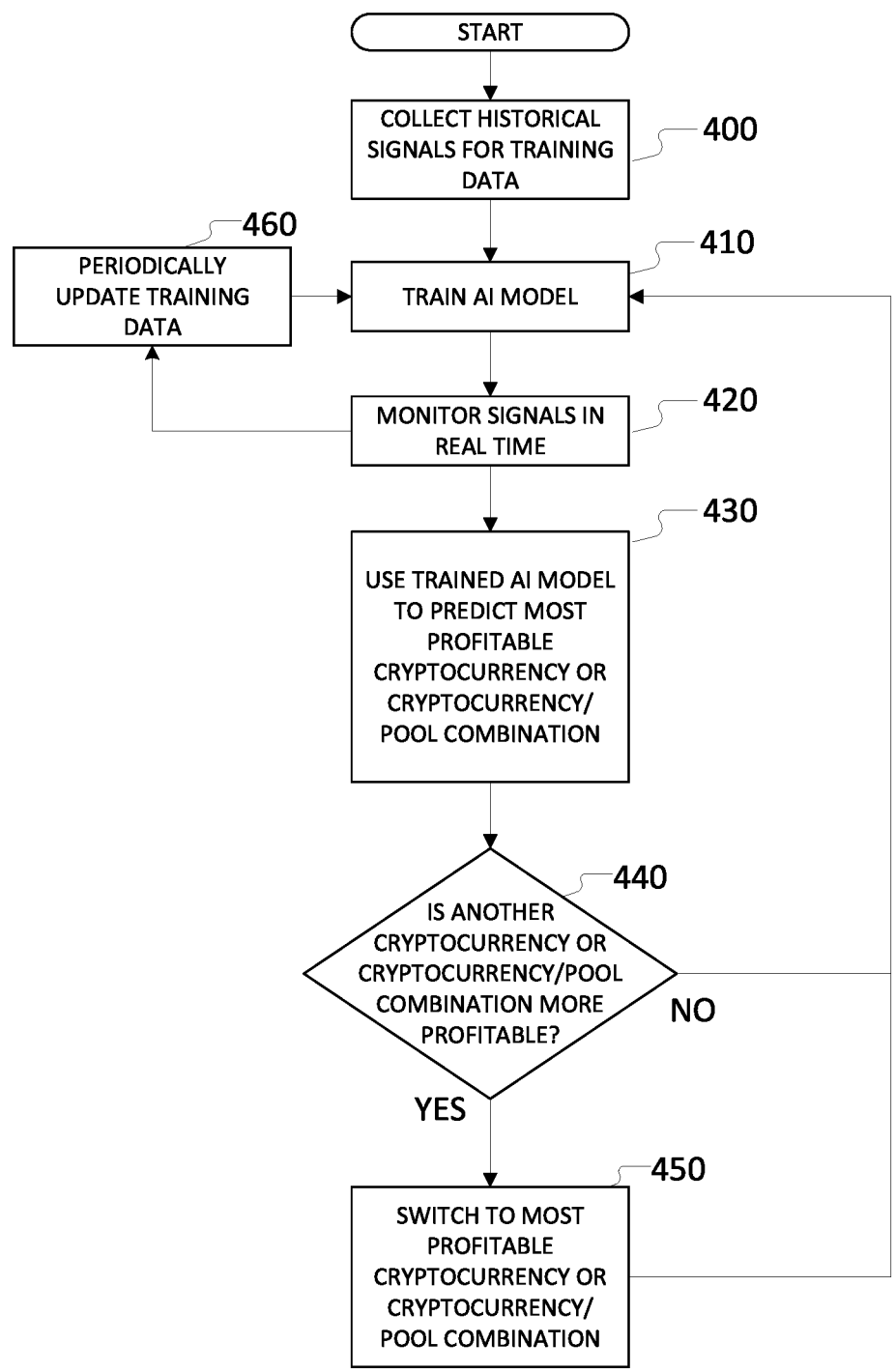
FIG. 4 is a flow chart generally illustrating another example of a method of automatically switching computing devices to improve profitability and return on investment according to teachings of the present disclosure.

Turning now to FIG. 4, a flow chart generally illustrating another example of a method of automatically switching computing devices to improve profitability and return on investment according to teachings of the present disclosure is shown. In this example embodiment, historical data signals are collected (step 400) and used as training data for training an artificial intelligence (AI) model (step 410). The data signals are also monitored in real time or near real time (step 420). The training data set may for example be periodically updated (step 460) and used to update or retrain the AI model (step 410).

The trained AI model may be used to predict the most profitable cryptocurrency or cryptocurrency/pool combination (step 430) for a future time period (e.g., until the next pool reward payment window). If the most profitable cryptocurrency or cryptocurrency/pool combination is different from the current workload being executed by the computing device (step 440), the computing device may be instructed to switch to the most profitable cryptocurrency or cryptocurrency/pool combination (step 450).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for optimizing returns generated by a computing device, the method comprising:
   instructing the computing device to work on a first workload, wherein the first workload is mining a first cryptocurrency;
   monitoring a plurality of signals impacting a profitability of mining for a plurality of different cryptocurrencies; and
   in response to the plurality of signals indicating a second cryptocurrency is the most profitable of the plurality of different cryptocurrencies, calculating a difference in profitability from the first workload being worked on by the computing device and a second workload being worked on by the computing device where the second workload is mining the second cryptocurrency; calculating a switchover cost representative of a time period during which no work is performed by the computing device when changing from the first workload to the second workload; and automatically switching the computing device to mine the second cryptocurrency if the difference in profitability is greater than the switchover cost, and mining the second cryptocurrency.

2. The method of claim 1, wherein the plurality of signals comprises mining difficulty, exchange rates, and pool fees.

3. The method of claim 2, wherein the plurality of signals further comprises difficulties, hashrates, and power costs.

4. The method of claim 3, wherein the monitoring is performed in real-time.

5. The method of claim 1, further comprising: measuring a switching time for the computing device; and using the measured switching time to calculate the switchover cost.

6. A method for optimizing returns generated by a computing device, the method comprising:
   monitoring a plurality of signals impacting mining profitability for a plurality of combinations of different cryptocurrencies and different mining pools;
   calculating a most profitable cryptocurrency and mining pool combination from the plurality of combinations of different cryptocurrencies and different mining pools;
   instructing the computing device to switch workloads to the most profitable cryptocurrency and mining pool combination, and mining the most profitable cryptocurrency;
   calculating a difference in profitability from a current workload being worked on by the computing device and the most profitable cryptocurrency and mining pool combination; and
   calculating a switchover cost representative of a time period during which no work is performed by the computing device when changing workloads, wherein the instructing is only performed if the difference in profitability is greater than the switchover cost.

7. The method of claim 6, wherein the plurality of signals further comprises difficulties, hashrates, and power costs.

8. The method of claim 6, wherein the monitoring and the calculating are performed on a management computer that communicates with the computing device via a network.

9. The method of claim 6, wherein the monitoring and the calculating are performed in real time.

10. The method of claim 6, wherein the plurality of signals are selected from a group comprising: expected reward, current difficulty, current exchange rate relative to a fiat currency, the computing device's hash rate, the computing device's power consumption, and the computing device's predicted failure rate.

11. The method of claim 6, wherein the plurality of signals comprises mining difficulty, exchange rates, and pool fees.

12. The method of claim 6, further comprising: training a machine learning model using historical data of the plurality of signals to identify correlations between the plurality of signals and the profitability of each of the plurality of cryptocurrency and mining pool combinations; and using the trained machine learning model to perform the calculating of the most profitable cryptocurrency and mining pool combination.

13. The method of claim 6, further comprising: training a machine learning model based on historical data to identify correlations between the plurality of signals and the profitability of each of the plurality of cryptocurrency and mining pool combinations; and using the trained machine learning model to determine when to perform the instructing and a power level setting at which to operate the computing device.

14. A non-transitory, computer-readable storage medium storing instructions executable by a processor of a computing device, which when executed cause the computing device to:
   monitor a plurality of signals impacting a profitability of mining for a plurality of different cryptocurrencies in a plurality of different mining pools;
   calculate a most profitable cryptocurrency and mining pool combination based on the plurality of signals;
   calculate a switching cost;
   predict a benefit to switching to the most profitable cryptocurrency and mining pool combination; and
   switch workloads to the most profitable cryptocurrency and mining pool combination if the switching cost is less than the predicted benefit, and mining the most profitable cryptocurrency.

15. The non-transitory, computer-readable storage medium of claim 14, wherein the plurality of signals further comprises difficulties, hashrates, and power costs.

16. The non-transitory, computer-readable storage medium of claim 14, wherein the instructions are firmware executable by the computing device, wherein the computing device executes the workloads.

17. The non-transitory, computer-readable storage medium of claim 14, wherein the computing device is a management computer, wherein the instructions are an application executable by the management computer, wherein the management computer manages another computing device that executes the workloads.

18. The non-transitory, computer-readable storage medium of claim 14, wherein the computing device is a management computer, wherein the instructions are an application executable by the management computer, wherein the management computer manages a plurality of computing devices that execute the workloads.

19. The non-transitory, computer-readable storage medium of claim 14, wherein the instructions are firmware executable to optimize a return on investment for the computing device.

20. The non-transitory, computer-readable storage medium of claim 14, wherein the plurality of signals comprise network hash rate, the computing device's power consumption, the computing device's hash rate, the power cost for the computing device, the computing device's estimated lifespan, the computing device's estimated failure rate, and the computing device's estimated switchover cost.

* * * * *